(12) United States Patent
Wu et al.

(10) Patent No.: US 6,272,452 B1
(45) Date of Patent: *Aug. 7, 2001

(54) UNIVERSAL ASYNCHRONOUS RECEIVER TRANSMITTER (UART) EMULATION STAGE FOR MODEM COMMUNICATION

(75) Inventors: Yung-Jung Wayne Wu, Brampton; Vladimir F. Giemborek, Richmond Hill; Wing-Chi Chow, Toronto, all of (CA)

(73) Assignee: ATI Technologies, Inc., Thornhill (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/053,929

(22) Filed: Apr. 2, 1998

(51) Int. Cl.[7] ........................................... G06F 9/44
(52) U.S. Cl. ........................ 703/24; 703/26; 709/250; 710/100; 712/227
(58) Field of Search .................. 703/24, 26, 25; 711/167, 219; 710/100, 52, 58, 62, 64; 709/250; 712/227

(56) References Cited

U.S. PATENT DOCUMENTS

| | | | |
|---|---|---|---|
| 4,907,225 | * | 3/1990 | Gulick et al. .................. 370/94.1 |
| 5,278,956 | * | 1/1994 | Thomsen et al. ................ 395/250 |
| 5,299,315 | * | 3/1994 | Chin et al. ...................... 395/250 |
| 5,604,870 | * | 2/1997 | Moss et al. ..................... 395/280 |
| 5,619,681 | * | 4/1997 | Benhamida et al. ............ 395/500 |
| 5,765,021 | * | 6/1998 | Hsu et al. ....................... 395/828 |
| 5,787,305 | * | 7/1998 | Chen ............................... 395/823 |
| 5,812,820 | * | 9/1998 | Loram ............................. 395/500 |
| 5,822,548 | * | 10/1998 | Story et al. .................... 395/286 |

* cited by examiner

Primary Examiner—Kevin J. Teska
Assistant Examiner—Thai Phan
(74) Attorney, Agent, or Firm—Markison & Reckamp, P.C.

(57) ABSTRACT

A universal asynchronous receiver transmitter (UART) emulation stage for modem communication uses a digital signal processor containing a software UART control program for sending UART control signals to hardware based UART emulation circuitry. The software UART control program communicates to a modem application interface program that is under control of a host processor. The UART emulation circuitry that is responsive to the control signals from the digital signal processor, includes dedicated transmit and receive FIFO buffer memory for storing modem data and also includes interrupt generation logic to generate an interrupt for the digital signal processor when the received FIFO buffer memory is at a predetermined threshold. The UART emulation circuitry also includes programmable control logic for facilitating host processor interrupt pacing to maintain high compatibility with legacy applications, namely DOS based applications.

16 Claims, 6 Drawing Sheets

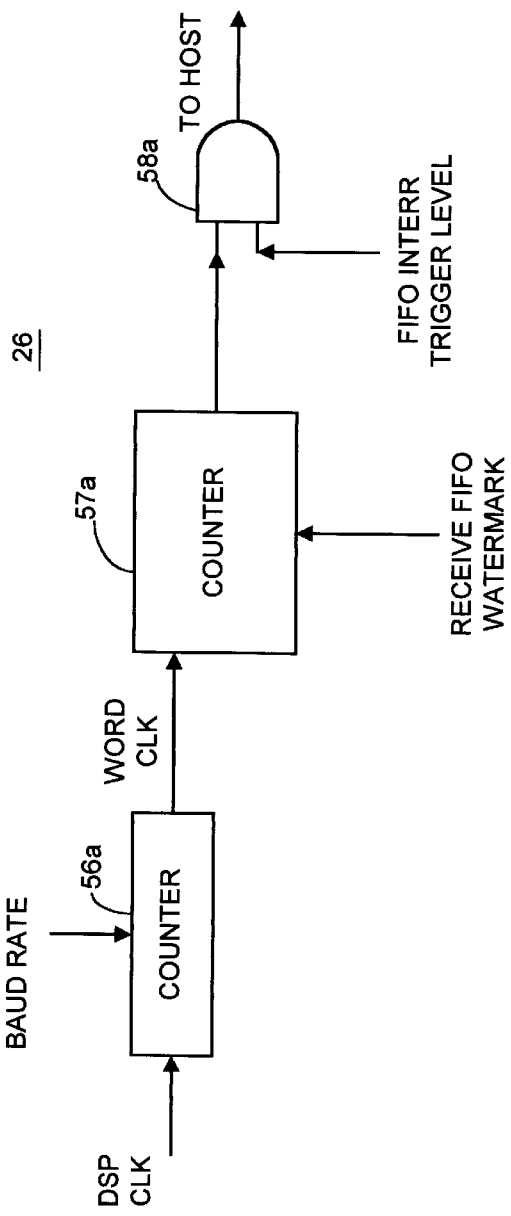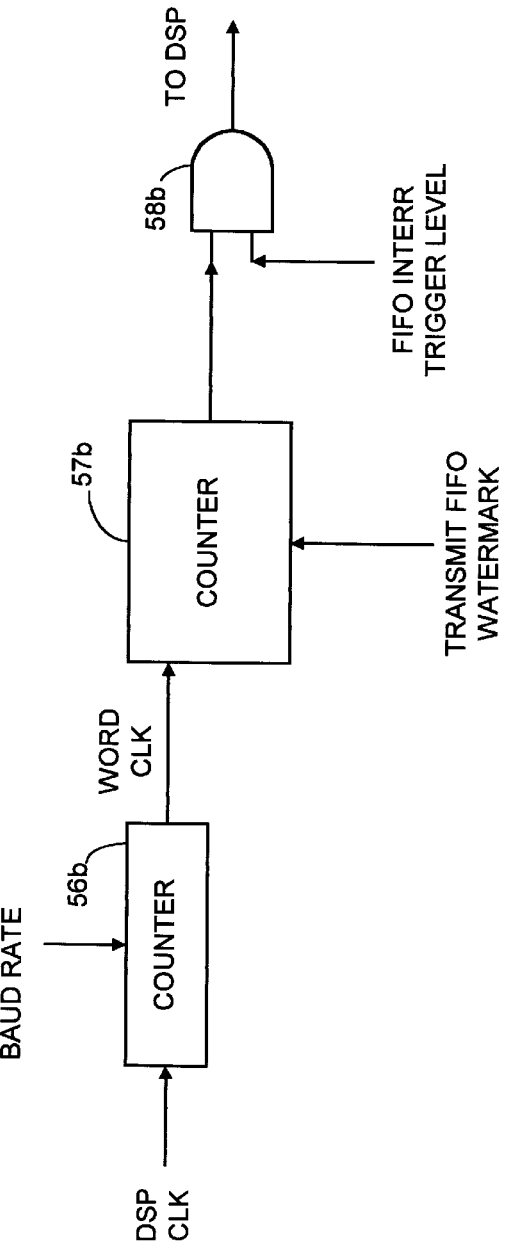

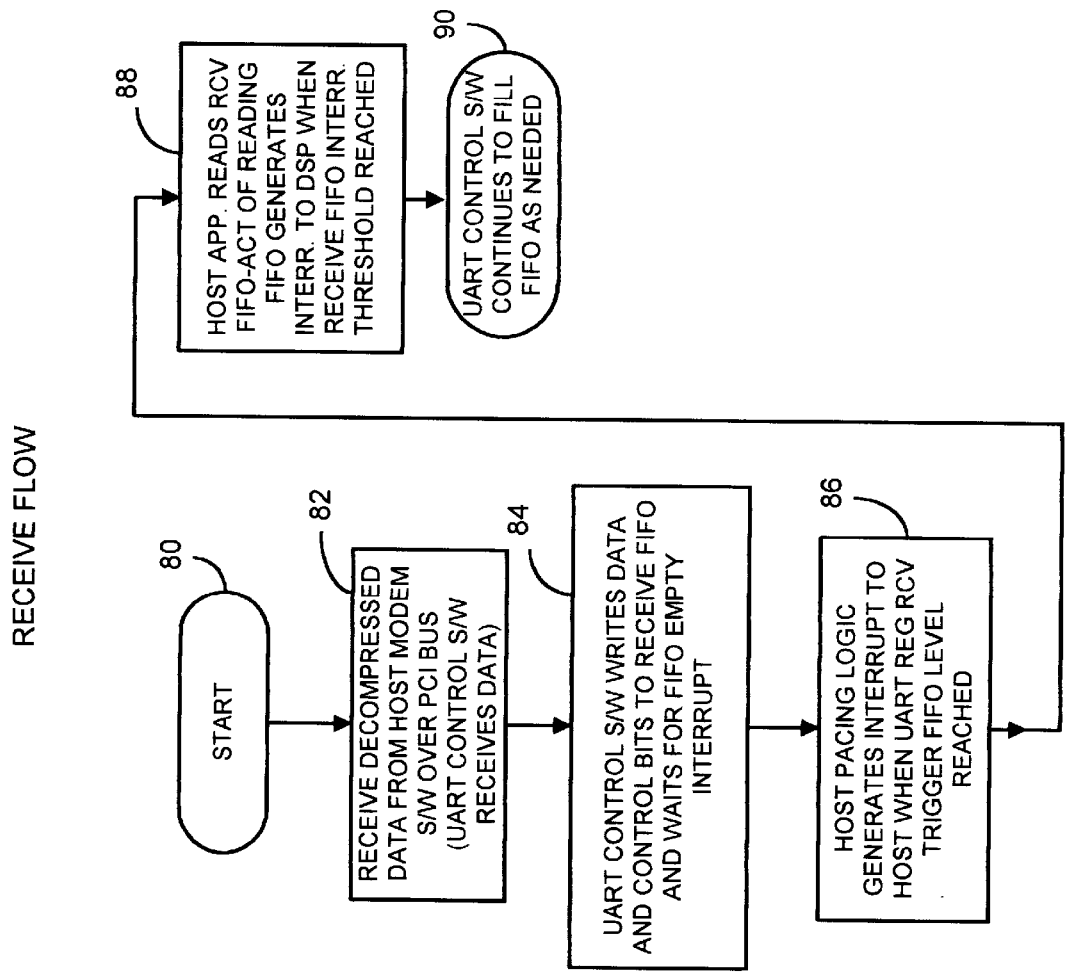

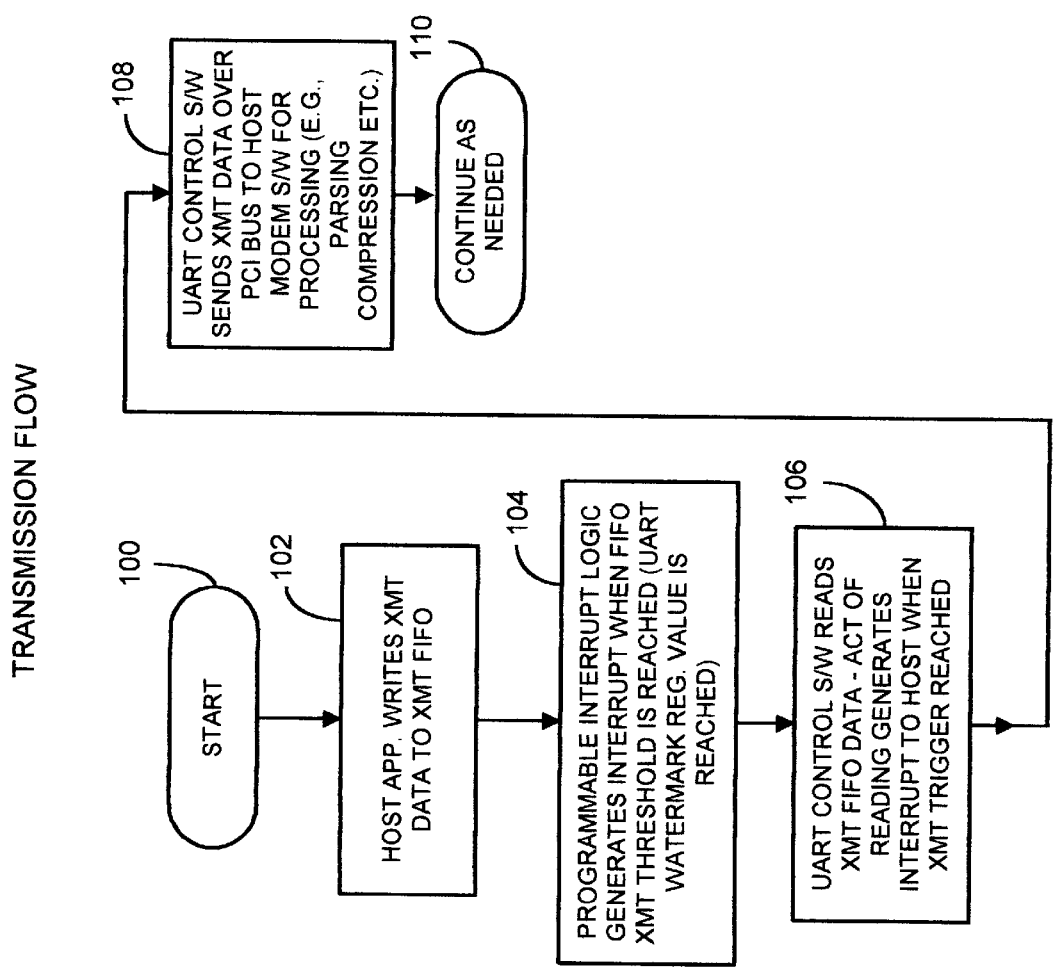

UNIVERSAL ASYNCHRONOUS RECEIVER TRANSMITTER (UART) EMULATION STAGE FOR MODEM COMMUNICATION

FIELD OF THE INVENTION

The invention relates generally to universal asynchronous receiver transmitters (UART) and more particularly to universal asynchronous receiver transmitter emulation stages for modem communication.

BACKGROUND OF THE INVENTION

In computer systems employing communications through modems, such as multimedia computer systems, window based applications employing windows native modes typically do not utilize a universal asynchronous receiver transmitter to communicate data through a modem. However, it is important in computer designs to provide legacy capability to allow use of old programs such as Disk Operating Systems (DOS) based software application programs to be run on windows based systems, such as Microsoft Windows® based operating systems to facilitate use of older and newer programming applications. For example, older games originally written for Disk Operating System based platforms are still prevalent and need to be accommodated to provide legacy for computer users. The DOS based applications typically use a UART to interface with a modem when receiving or transmitting data over the modem. Computer systems having modems that support both DOS and Windows based applications are therefore desirable. In such systems, a software application used in a host computer typically communicates through the host to a hardware based UART such as a 16550 type hardware UART which then communicates over a selected communication port to a modem.

Often, DOS based applications have set COM port addresses whereas Windows based applications typically have software drivers used to mimic UART interfaces and therefore Windows applications often do not require use of a hardware based UART. A problem arises with UARTs that are primarily hardware based since the real estate on modem boards and the cost of necessary circuitry including memory on modem boards can unnecessarily increase the cost of the system. Also, some systems use small interface buffers to help facilitate a smoother access and transfer of data by a host computer, however, the use of small buffer memory to reduce cost can result in inefficient use of host processor time by having to obtain the data more often or in smaller amounts resulting in undesirable interrupt of the host computer.

Therefore, a need exists for a lower cost UART emulation system that can be used in computers that facilitate compatibility with DOS based applications and Windows based applications. It would also be desirable, if such an UART emulation system used effective interrupt management to avoid unnecessary interruption of the host during use of the UART emulation stage.

BRIEF DESCRIPTION OF THE DRAWINGS

FIG. 3A is a block diagram generally depicting an example of UART emulation stage control logic to facilitate pacing of a host computer interrupt in accordance with one embodiment of the invention;

FIG. 3B is a block diagram generally depicting an example of UART emulation stage control logic to facilitate pacing of a DSP interrupt in accordance with one embodiment of the invention;

FIGS. 5A and 5B are flow diagrams generally depicting one embodiment of data transmission and data receive flow in a computer system employing one embodiment of the invention.

DETAILED DESCRIPTION OF THE INVENTION

A universal asynchronous receiver transmitter (UART) emulation stage for modem communication uses a digital signal processor (DSP), such as a separate DSP from a host CPU, containing a software UART control program for sending UART control signals to hardware based UART emulation circuitry. The software UART control program communicates to a modem application interface program that is under control of a host processor. The UART emulation circuitry is responsive to the control signals from the digital signal processor, and includes dedicated transmit and receive FIFO buffer memory for storing modem data and also includes interrupt generation logic to generate an interrupt for the digital signal processor when the received FIFO buffer memory is at a predetermined threshold. The UART emulation circuitry also includes programmable control logic for facilitating host processor interrupt pacing to maintain high compatibility with legacy applications, namely DOS based applications.

Figure 1:
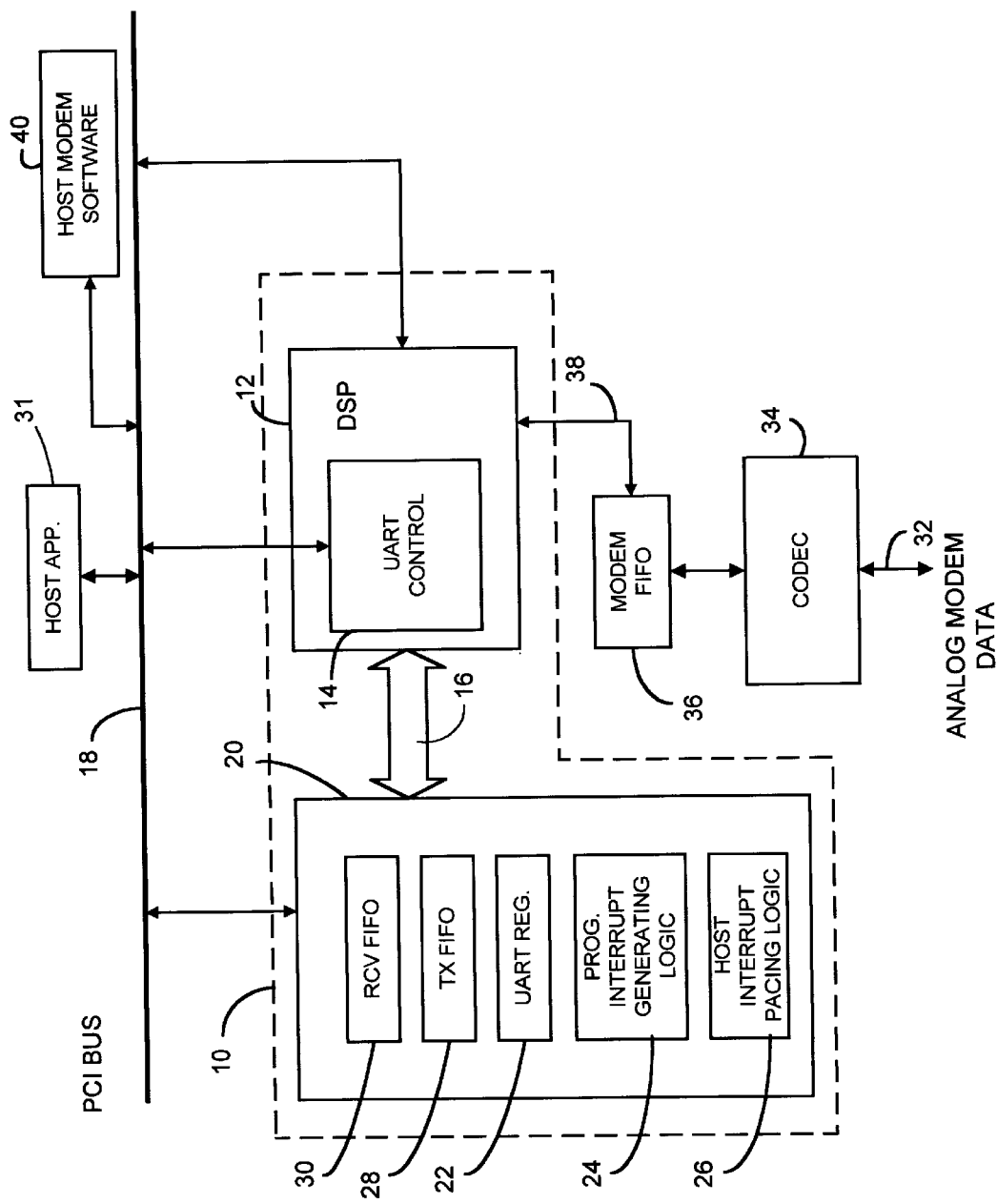
FIG. 1 is a block diagram generally depicting a modem and associated UART emulation stage in accordance with one embodiment of the invention.

FIG. 1 shows a portion of a multimedia computer incorporating an UART emulation stage 10 having a digital signal processor DSP 12 containing a software UART control program 14 for sending UART control signals and data over bus 16 and for communicating to a modem application interface program through a bus such as a PCI bus 18. The UART emulation stage 10 also includes UART emulation circuitry 20 that communicates with the DSP 12 over bus 16. The UART emulation circuitry includes standard 16550 type UART registers 22, programmable interrupt generating logic 24, programmable host interrupt pacing logic 26, transmit FIFO memory buffer 28 and receive FIFO buffer memory 30. As shown, a host application 31 may communicate with the UART emulation circuitry 20 through the PCI bus 18 and the DSP 12 may communicate with the host computer through the UART control software 14.

For purposes of illustration, FIG. 1 shows the DOS based host application 31 receiving analog modem data 32 digitally coded by a suitable coder/decoder (CODEC) 34. The digital modem data 32 is then temporarily stored in a modem FIFO 36 and received by the digital signal processor 12 through bus 38. The digital signal processor 12 processes the data and then bus masters the processed data from the digital signal processor 12 to the host computer through a modem software controller 40, known in the art, such as a virtual device driver in Microsoft (trademark) Windows applications. The host then performs any controller processing on the data as needed. The data is then bus mastered from the host back to the digital signal processor 12 under control of the modem software controller 40. The DSP 12 passes the data to the UART emulation circuitry 20 via bus 16 into receive FIFO 30.

Generally, the flow of data when transmitting data via the UART emulation stage 10 proceeds as follows. A host DOS communication application 31 writes data into a UART transmitter holding register, such as the transmit buffer 28. When a predetermined threshold level is reached or time out occurs, the programmable interrupt generation logic 24 generates an interrupt to the digital signal processor 12 over bus 16. The digital signal processor 12 then reads the contents of the transmit FIFO buffer memory 28. The digital signal processor then bus masters the read FIFO data back to the host through the modem software controller 40. The host may then perform any controller processing on the data and the DSP 12 bus masters the data from the host back to the DSP 12. The digital signal processor 12 then processes the data as needed, and then transfers the data to the CODEC 34 through link 38.

The standard 16550 UART registers 22 preferably includes the standard twelve 8-bit registers that are accessible via input/output addresses, as known in the art. For example, the following UART registers are in block 22: Receive buffer register, Transmit holding register, Interrupt/Enable register, Interrupt ID register, FIFO control register, Line control register, Modem control register, Line Status register, Modem Status register, Scratch register, Divisor Latch, LSB and Divisor Latch, MSB. As with conventional 16550 type UART devices, the FIFO control register includes a limited FIFO trigger level setting (2 bits) that provides a coarse trigger level for generating an interrupt to the host computer when the receive FIFO 30 is filled to the coarse trigger level. In standard 16550 type UART devices, a conventional receive FIFO is typically limited to 16 entries and the trigger level can only be set at predefined thresholds. In contrast, the receive FIFO 30 has 32 entries and additional programmable registers such as FIFO threshold registers to facilitate host pacing and larger data transfers. However, the host application 31 believes that it is using standard 16550 UART hardware.

In this embodiment, all UART registers are readable by the digital signal processor 12 through the DSP I/O space. Preferably, three registers are writeable by the DSP: the receive buffer register, the line status register and the modem status register. All other UART registers are preferably read only by the digital signal processor 12. It will be recognized by those of ordinary skill in the art that other read/write variations may also be used.

Figure 2:
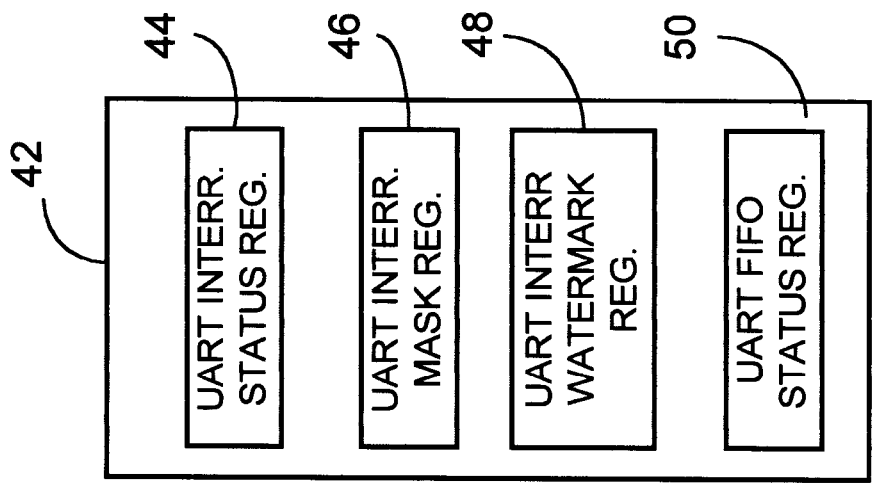
FIG. 2 is a block diagram generally depicting in more detail a hardware portion of the UART emulation stage in accordance with one embodiment of the invention.

Referring to FIG. 2, the programmable interrupt generation logic 24 and the host interrupt pacing logic 26 uses additional DSP related registers 42. The additional DSP related registers 42 include a 16 bit UART interrupt status register 44 that tells the DSP 12 what has been updated by the host in the standard UART registers 22. The DSP is interrupted when the host application writes to the standard UART registers 30. Also included is a 16 bit UART interrupt mask register 46 which controls whether certain registers when written to generate an interrupt to the digital signal processor 12. The UART interrupt mask register provides masking of the UART interrupt status register 44 to avoid unnecessary DSP interrupts during initialization and error recovery. Another additional register is a 24 bit UART interrupt watermark (threshold level) register 48, that provides programmable setting of a watermark for transmit FIFO 28 and receive FIFO 30 to facilitate variable DSP interrupt periods or frequencies for greater efficiency and also includes bits for enabling host interrupt pacing. The watermark may be set to a higher level at higher baud rates. Also, a UART FIFO status register 50 provides data for the DSP 12, when it is interrupted, indicating how many unused entries are left in the receive FIFO 30 and how many bytes available in the transmit FIFO 28.

A more detailed example of suitable bit designations for the above registers is shown below.

| Field Name | Bit(s) | Description |
| --- | --- | --- |
| UART_INTR_MASK | | |
| UART_RX_MASKb | 0 | Interrupt Mask - Rx FIFO ready to accept data |
| UART_TX_MASKb | 1 | Interrupt Mask - Data available in Tx FIFO |
| UART_IER_MASKb | 2 | Interrupt Mask - Interrupt Enable Register written by host |
| UART_FCR_MASKb | 4 | Interrupt Mask - FIFO Control Register written by host |
| UART_LCR_MASKb | 5 | Interrupt Mask - Line Control Register written by host |
| UART_MCR_MASKb | 6 | Interrupt Mask - Modem Control Register written by host |
| UART_LSR_MASKb | 7 | Interrupt Mask - Disable TX character Timeout |
| UART_MSR_MASKb | 8 | |
| UART_DLL_MASKb | 10 | Interrupt Mask - Divisor Latch, Low Byte written by host |
| UART_DLM_MASKb | 11 | Interrupt Mask - Divisor Latch, High Byte written by host |
| UART_INTR_STAT | | |
| UART_RX_INTR | 0 | Rx FIFO ready to accept data |
| UART_TX_INTR | 1 | Data available in Tx FIFO |
| UART_IER_INTR | 2 | Interrupt Enable Register written by host |
| UART_FCR_INTR | 4 | FIFO Control Register written by host |
| UART_LCR_INTR | 5 | Line Control Register written by host |
| UART_MCR_INTR | 6 | Modem Control Register written by host |

-continued

| Field Name | Bit(s) | Description |
| --- | --- | --- |
| UART_DLL_INTR | 10 | Divisor Latch, Low Byte written by host |
| UART_DLM_INTR | 11 | Divisor Latch, High Byte written by host |
| UART_INTR_WATERMARK [R/W] | | |
| UART_RX_WATERMARK | 5:0 | Rx FIFO watermark |
| UART_TX_WATERMARK | 13:8 | Tx FIFO watermark |
| UART_TX_TIMEOUT | 21:16 | Tx FIFO character timeout |
| UART_RX_PACE_INTR_DIS | 22 | 0 = Pacing of Host Interrupt Enabled (Default) |
| | | 1 = Pacing of Host Interrutp Disabled |
| UART_TX_PACE_INTR_DIS | 23 | 0 = Pacing of Host Interrupt Enabled (Default) |
| | | 1 = Pacing of Host Interrutp Disabled |
| UART_FIFO_STAT [R] | | |
| UART_RX_FREE_NUM | 5:0 | Number of Free (Unused) Entries in Receive FIFO |
| UART_TX_AVAIL_NUM | 13:8 | Number of Bytes Available in Transmit FIFO |
| UART_CLK_DIVISOR | 15:14 | |

The programmable interrupt generating logic 24 generates an interrupt to the DSP 12 when the standard UART registers 22 are written to or when the transmit or receive FIFO watermark is reached. The UART interrupt status register 44 indicates the source of the interrupt.

By varying the transmit and receive FIFO watermarks, the digital signal processor 12 controls the rate at which the transmit/receive FIFOs 28 and 30 interrupt the DSP. The rate is controlled by writing to the UART interrupt watermark register 48 to vary a watermark of the transmit/receive FIFOs to allow more data or less data to trigger an interrupt.

The host interrupt pacing logic 26 paces interrupts to the host processor to avoid overflow or underflow of data to the host application buffer when data to and from the host occurs in bursts. The host interrupt pacing logic 26 includes use of the divisor latch registers and the receive FIFO trigger level. For example, if the divisor latch registers are programmed to set a particular bit rate, and the receive FIFO threshold has been set to a predetermined threshold, then a set period of time between interrupts is generated. This interrupt pacing is controlled by a UART pace interrupt disable bit which may be located in a UART interrupt watermark level register.

FIG. 3A shows a block diagram of an example of the host interrupt pacing logic 26 which includes a counter 56 that receives baud rate data and DSP clock speed data. The counter 56 outputs a word clock signal that is received by another counter 57. Counter 57 also receives a receive FIFO watermark (threshold) and outputs a count signal to dual input AND gate 58. The AND gate 58 also receives the FIFO interrupt trigger level. The receive FIFO watermark data serves in part as interrupt signal data. It will be recognized that the logic 26 may be any suitable comparator circuitry or software which determines whether to pace a host interrupt signal based on the baud rate data, clock speed data and receive interrupt signal data. For example, the host pacing interrupt logic 26 generates host processor interrupt pacing to facilitate overriding of the interrupt from the UART emulation circuitry to the host processor when write bursts occur from the digital signal processor 12. In operation, the host processing interrupt logic 26 compares the clock speed to the set baud rate to determine the rate at which data will be written to the receive FIFO buffer memory 30. The host pacing interrupt logic 26 utilizes the receive FIFO threshold level data to determine when the trigger level has been reached. When the trigger level is reached, an interrupt is generated.

FIG. 3B shows one example of an implementation of the logic for pacing the DSP interrupt. The DSP interrupt pacing logic has the same logic components as the host interrupt pacing logic (FIG. 3A) as shown. However, the DSP interrupt pacing logic uses the transmit FIFO watermark data instead of the receive FIFO watermark data. In operation, the DSP interrupt pacing logic keeps the DSP aligned to the baud rate to prevent the DSP form overflowing the UART when the UART is transmitting data. It will be recognized that the logic may be any suitable comparator circuitry or software which determines whether to pace a DSP interrupt signal based on the baud rate data, clock speed data and transmit interrupt signal data.

Figure 4:
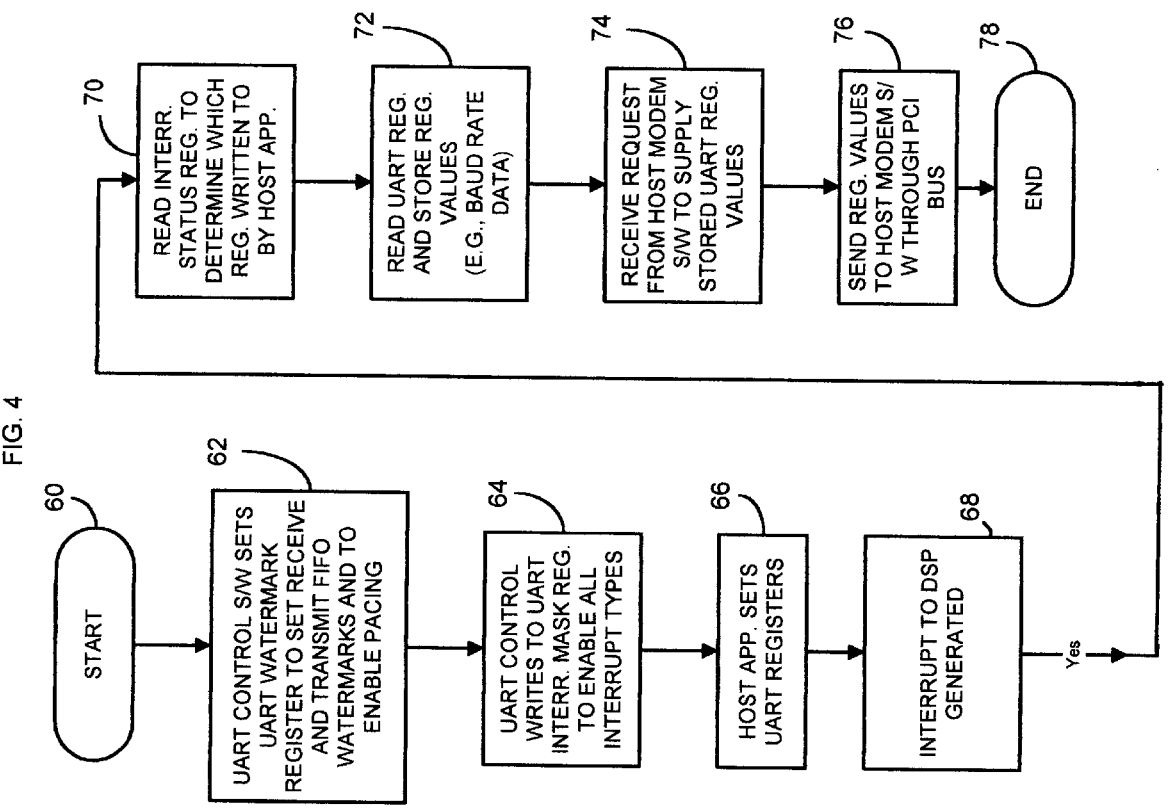
FIG. 4 is a flow diagram generally depicting the operation of a digital signal processor UART control block for one embodiment of UART emulation stage in accordance with one embodiment of the invention.

FIG. 4 is a flow chart showing one embodiment of the operation of the UART controller 14 in connection with other components of the system. As shown in blocks 60 and 62 during initialization, the DSP under control of the UART controller 14 writes to the UART interrupt watermark register 48 to set the receive and transmit FIFO watermarks and to enable pacing. The controller 14 also writes to the UART interrupt mask register 46 to enable all interrupt types. This is shown in block 64. In block 66, the host application 31 sets the standard UART registers 22. When the host application 31 is finished writing to the UART registers 22, the programmable interrupt generating logic 24 updates the UART interrupt status register 44 and generates an interrupt to the DSP 12, as shown in block 68. As shown in block 70, the controller 14 reads the interrupt status register 44 to determine which registers were written to by the host application 31. The controller 14 reads the corresponding UART registers and stores the register values, such as baud rate data, as shown in block 72. Next, in blocks 74 and 76, the controller 14 then receives a request from the host modem software 40 to transmit the stored UART register values and the controller 14 sends the register values to the host modem software through the PCI bus 18. The controller 14 then waits for the next interrupt as shown in block 78 and services the next interrupt accordingly.

Referring to FIG. 5A, a more detailed operation of the controller 14 will be described in connection with receiving data from the codec 34 (FIG. 1). In block 80, received compressed information from codec 34 is sent by the DSP 12 to the host modem software 40 for decompression and other processing. In block 82, the controller 14 receives decompressed data from the host modem software 40 over PCI bus 18. The UART controller 14 writes the received decompressed data to the receive FIFO 30 over bus 16 and waits for a FIFO empty interrupt from programmable interrupt generating logic 24 through UART interrupt status register 44. This is shown in block 84. The host interrupt pacing logic 26 generates an interrupt to the host application 31 when the standard UART register 22 receive FIFO trigger level is reached as shown in block 86. In block 88, the host application reads the receive FIFO and the act of reading the FIFO causes the programmable interrupt generating logic 24 to generate an interrupt to the DSP 12 when the receive FIFO interrupt watermark (threshold level) is reached. As shown in block 90, the controller 14 continues to fill the receive FIFO 30 as needed and the process repeats.

FIG. 5B shown a more detailed operation of the controller 14 in connection with transmitting data from the host application 31 out codec 34 (FIG. 1). In blocks 100 and 102, the host application receives data for modem transmission and writes the transmit data to the transmit FIFO 28 over PCI bus 18. In block 104, the programmable interrupt logic 24 generates a DSP interrupt when the programmed FIFO transmit watermark is reached. The controller 14 then services the interrupt by reading the transmit FIFO 28 data as indicated in block 106. The act of reading this data generates a transmit holding register empty interrupt to the host. Next, the controller 14 sends the read transmit data over the PCI bus 18 to the host modem software 40 for processing such as parsing, compression or other desired processing as shown in block 108. If desired, the UART controller 14 may buffer the data before sending it to the host modem software. The host modem software 40 then transmits the processed data back to another DSP controller (not shown) for transmission to the codec. The transmit process continues as indicated in block 110 until all data is transmitted.

As described above, the variable host pacing is conditionally enabled by the controller 14. Host pacing is normally disabled if the host application sets the baud rate at the highest rate. The host interrupt pacing logic 26 facilitates presentation of data to the host application at a rate that averages the baud rate even though the UART emulation system 10 can operate in bursts.

Preferably the emulation stage 10 is contained on a single integrated circuit. Also preferably the emulation stage emulates a 16550 type UART to facilitate the host processor operating in a disk operating systems (DOS) mode. However, it should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A universal asynchronous receiver transmitter (UART) emulation stage for modem communication comprising:
a digital signal processor containing a software UART control program for sending UART control signals over a bus and for communicating to a modem application interface program that is under control of a host processor;
UART emulation circuitry operatively coupled to the digital signal processor via the bus and responsive to the control signals from the digital signal processor based software UART control program, including at least dedicated transmit and receive FIFO buffer memory for storing modem data and programmable interrupt generation logic controllable by the digital signal processor, to generate an interrupt for the digital signal processor when the receive FIFO buffer memory is at a predetermined threshold; and further includes programmable control logic for facilitating host processor interrupt pacing to facilitate overriding of the interrupt from the UART emulation circuitry to the host processor due to write bursts from the digital signal processor.

2. The UART emulation stage of claim 1 wherein the control logic for facilitating host processor interrupt pacing further includes means for receiving baud rate data, clock speed data and receive interrupt signal data and means, responsive to the baud rate data, clock speed data and receive interrupt signal data for determining whether to pace a host interrupt.

3. The universal asynchronous receiver transmitter (UART) emulation stage of claim 1 wherein the UART emulation stage is contained on a single integrated circuit.

4. The UART emulation stage of claim 1 wherein the emulation stage emulates a 16550 tye UART to facilitate the host processor operating in a disk operating system mode (DOS).

5. The UART emulation stage of claim 1 wherein the modem data is transferred between the FIFO buffer memory and the host processor through the digital signal processor.

6. The UART emulation stage of claim 1 wherein UART emulation circuitry includes UART registers and wherein the interrupt generation logic also generates an interrupt for the digital signal processor when the UART registers are written and when a UART FIFO buffer memory threshold is reached.

7. A universal asynchronous receiver transmitter (UART) emulation for modem communication comprising:
a digital signal processor containing a software UART control program for sending UART control signals over a bus and for communicating to a modem application interface program that is under control of a host processor; and
UART emulation circuitry, operatively coupled to the digital signal processor via the bus and responsive to the control signals from the digital signal processor based software UART control program, including at least dedicated transmit and receive FIFO buffer memory for storing modem data, interrupt generation logic to generate an interrupt for the host processor when the receive FIFO buffer memory is at a predetermined threshold, control logic for facilitating host processor interrupt pacing to facilitate overriding of the interrupt from the UART emulation circuitry to the host processor due to write bursts from the digital signal processor, and UART registers wherein the interrupt generation logic also generates an interrupt for the digital signal processor when the UART registers are written and when a UART FIFO buffer memory threshold is reached.

8. The UART emulation stage of claim 7 wherein the control logic for facilitating host processor interrupt pacing further includes means for receiving baud rate data, clock speed data and receive interrupt signal data and means, responsive to the baud rate data, clock speed data and receive interrupt signal data for determining whether to pace a host interrupt.

9. The universal asynchronous receiver transmitter (UART) emulation stage of claim 8 wherein the UART emulation stage is contained on a single integrated circuit.

10. The UART emulation stage of claim 7 wherein the modem data is transferred between the FIFO buffer memory and the host processor through the digital signal processor.

11. A method for facilitating universal asynchronous receiver transmitter (UART) emulation for modem communication comprising:

utilizing a software UART control program for sending UART control signals and for communicating to a modem application interface program that is under control of a host processor;

storing modem data in at least dedicated transmit and receive FIFO buffer memory;

generating an interrupt for the digital signal processor when the receive FIFO buffer memory is at a predetermined threshold; and providing host processor interrupt pacing to facilitate overriding of the interrupt from the UART emulation circuitry to the host processor due to write bursts from the digital signal processor.

12. The method of claim 11 including receiving baud rate data, clock speed data and receive interrupt signal data and determining whether to pace a host interrupt based on the baud rate data, clock speed data and received interrupt signal data.

13. The method of claim 11 including transferring modem data between the FIFO buffer memory and the host processor through the digital signal processor.

14. A method for facilitating universal asynchronous receiver transmitter (UART) emulation for modem communication comprising:

utilizing a software UART control program for sending UART control signals and for communicating to a modem application interface program that is under control of a host processor;

storing modem data in at least dedicated transmit and receive FIFO buffer memory;

generating an interrupt for the digital signal processor when the receive FIFO buffer memory is at a predetermined threshold;

facilitating host processor interrupt pacing to facilitate overriding of the interrupt from UART emulation circuitry to the host processor due to write bursts from the digital signal processor, and generating an interrupt for the digital signal processor when UART registers are written and when a UART FIFO buffer memory threshold is reached.

15. The method of claim 14 including receiving baud rate data, clock speed data and receive interrupt signal data and determining whether to pace a host interrupt based on the baud rate data, clock speed data and received interrupt signal data.

16. The method of claim 14 including transferring modem data between the FIFO buffer memory and the host processor through the digital signal processor.

* * * * *